UNITED STATES PATENT OFFICE.

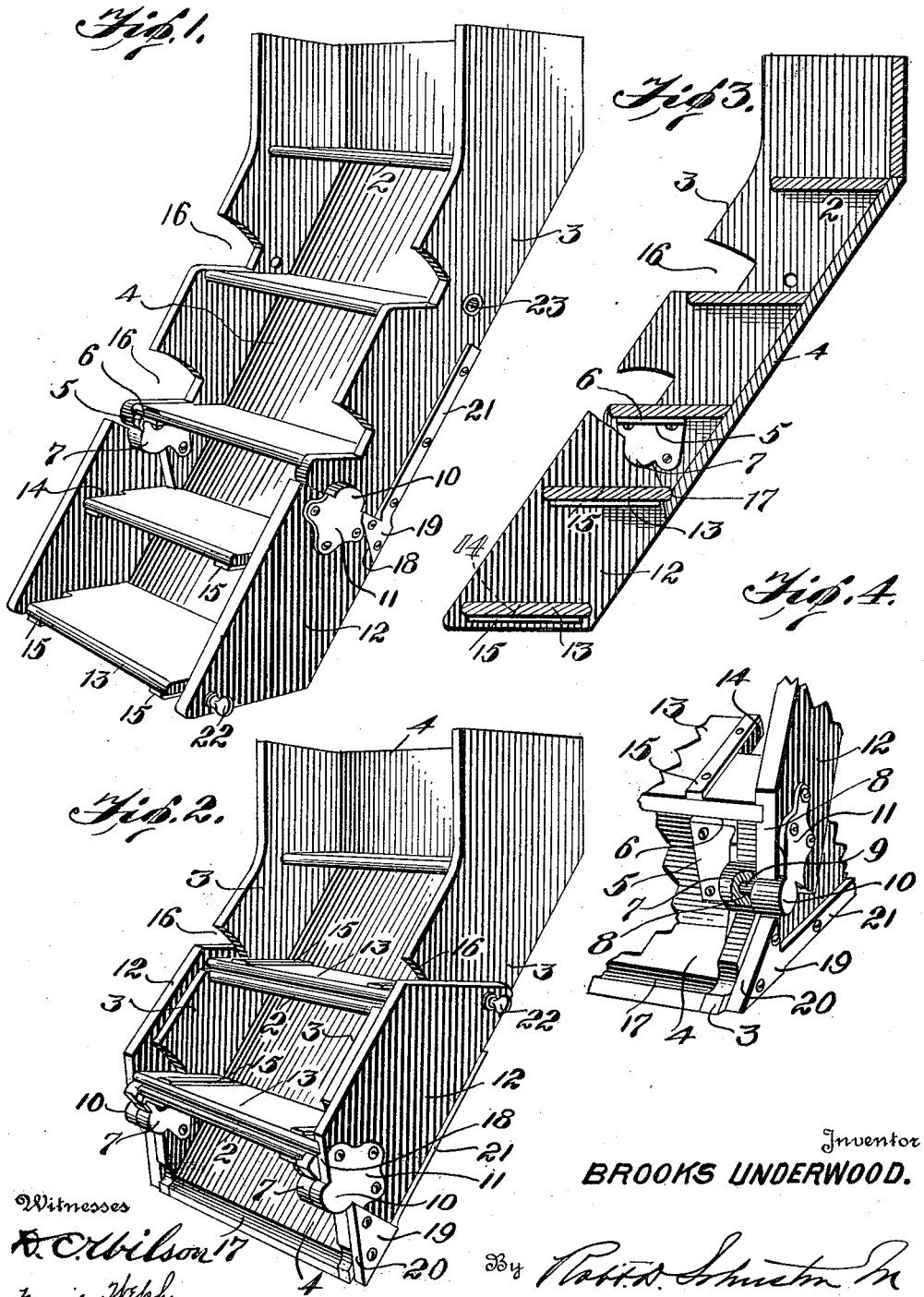

BROOKS UNDERWOOD, OF BIRMINGHAM, ALABAMA.

EXTENSION CAR-STEP.

1,140,547.    Specification of Letters Patent.    Patented May 25, 1915.

Application filed February 27, 1915. Serial No. 11,097.

*To all whom it may concern:*

Be it known that I, BROOKS UNDERWOOD, a citizen of the United States of America, residing at Birmingham, in the county of Jefferson and State of Alabama, have invented certain new and useful Improvements in Extension Car-Steps, of which the following is a specification.

My invention relates to an improvement in the steps for railroad passenger coaches and its object is to provide an extension step attachment by the use of which I can dispense with stools and avoid a large percentage of step accidents.

The principal object of my invention is to so design and attach the extension steps that they can be folded up and over the fixed steps and out of the way where they will not affect the appearance of the latter steps nor interfere with their normal use.

A further object of my invention is to form the extension steps of rigidly connected parts which are so hinged to the fixed steps that when swung upwardly their inverted tread faces will lie upon the tread faces of the lower fixed steps with the result that the tread faces of the most exposed steps are protected from rain, snow and ice.

A further object of my invention is to simplify and perfect the manner of attaching the extension steps to the fixed steps so that the latter will rigidly brace and support the extension steps when the latter do not reach to the ground to receive support therefrom.

My invention further comprises the novel details of construction and arrangement of parts, which in their preferred embodiment only are hereinafter more particularly described, reference being had to the accompanying drawings which form a part of this specification, and in which:—

Figure 1 is a perspective view of the coach steps with the extension steps in lowered position. Fig. 2 is a similar view showing the extension step folded up. Fig. 3 is a vertical central sectional view of Fig. 1. Fig. 4 is a detail view of the corner joint of the extension steps and folded up as shown in Fig. 2.

Similar reference numerals refer to similar parts throughout the drawings.

The coach 1 is provided with fixed steps comprising treads 2 suitably attached to risers 3 and to a back plate 4. At the lower end of each riser and on its inside face I attach a metal bracket 5 having a right angled flange 6 which is attached to the underside of the lower tread 2 and forms an angle brace between the latter and the risers. The lower ends of the brackets form thickened lugs 7 that extend below the risers and have each an outwardly facing socket 8 adapted to receive a stud bearing pin 9 on a thickened lug 10 formed integral with a plate 11, which plates are attached to the outer sides of the risers 12 for the extension steps. These risers have rigidly connected to them one or more treads 13, which it will be noted are notched out to form slots 14 which extend inwardly along the risers 12 about half way of the depth of the tread. In order to reinforce the outer ends of the treads 13 which may be somewhat weakened by the slots 14, I provide metal straps 15 which are attached to the underfaces of the treads and extend from front to rear alongside the slots 14, as seen in Fig. 2. It will be noted that the fixed risers 3 above the two lower treads 2 are provided with notches 16 designed to receive and permit the inner ends of the slots 14 to pass inwardly until they engage the rear wall of the slot 16. In this position the risers 12 overlap the risers 3 on the outside and the notched walls of the treads 13 overlap the inner side of the risers 3, thus effectively interlocking the extension steps with the fixed steps and at the same time it will be noted that slots 14 and 16 are such as to permit the inverted treads of the extension steps to rest upon the treads 2 and the steps will then differ from the ordinary coach steps only in that the two lower treads are of double thickness. As the passengers will under these conditions step on the bottom face of the treads 13, such faces may be provided with any suitable safety tread surface.

In order to provide for the use of the extension steps in a case where they are not long enough to rest upon the ground or platform, I provide a transverse groove or seat 17 which extends across the lower end of the back wall 4 and of the risers 3. The rear edge of the upper tread 13 is adapted to swing down into engagement with and bear against this seat when the extension steps have swung down into line with the fixed steps. In order to further brace the extension steps, I provide the risers 12 at their rear corner with a beveled face 18 and I attach to the outer faces of the fixed risers 3 a metal brace plate having at its lower end a head 19 with a beveled bearing face 20, and having a shank member 21 which extends up along the riser 3 and is bolted or screwed thereto. The beveled face 18 of each extension riser 12 is adapted to bear against the beveled face 20 of a brace 19 and prevent the extension steps swinging under the fixed steps. These braces and the engagement of the upper step 13 in the seat 17 gives a very firm and rigid support from the fixed steps so that they will support the passenger's weight without resting on the ground. The lower portions of the risers 3 are reinforced by the shanks 21.

I provide one of the extension risers 12 with a spring pressed lock plunger 22 adapted to engage in a socket 23 on the adjacent fixed riser 3 when the extension steps are in raised position to lock them against accidental lowering.

The treads of the extension steps 13 and of the two lower steps 2 are effectively protected from becoming covered with snow and ice by reason of their overlapping position when in service and I thereby avoid a source of constant injury to passengers.

I have illustrated what I regard as the preferred embodiment of my invention, but it will be understood that I may use only one extension step and that there may be various other novel changes to conform to the different constructions of the car steps without departing from the spirit of my invention.

Having thus described my invention, what I claim as new and desire to secure by Letters Patent, is:—

1. In an extension car step, the combination with fixed steps and their risers, of one or more extension steps, risers for said extension steps, and fixed pivots connecting the upper ends of the extension risers to the lower ends of the fixed step risers, said pivot point being disposed to permit the extension step or steps when swung upwardly about the pivot to lie upon the fixed steps, one set of the steps and one set of the risers being notched to permit the extension steps to assume an overlapping position on the fixed steps, substantially as described.

2. In an extension car step, the combination with fixed steps and side members forming risers therefor, of one or more extension steps and side members rigidly connected to said extension steps and forming risers therefor, said fixed and extension risers being offset and connected at their meeting ends by fixed pivots, one of the sets of risers having notches to receive the other steps, and the said other steps having notches to receive the unnotched risers, substantially as described.

3. In an extension car step, the combination with fixed steps and their risers, of one or more extension steps and risers therefor, the fixed risers having outwardly facing openings adjacent to the lower step or steps, and the extension steps having outwardly opening notches adjacent to their risers, means to pivotally connect the fixed and extension risers to adapt the notched parts of the extension steps to swing into said openings in the fixed risers, substantially as described.

4. In an extension car step, the combination with fixed steps and their risers, of a back plate connected to said risers, an extension step or steps, risers therefor pivotally connected near the lower ends of the fixed risers, the rear end of the upper extension step being adapted to engage and bear against the back plate and the fixed risers when in its lowered operating position.

5. In an extension car step, the combination with fixed steps and their risers, of a plurality of extension steps and risers therefor, means to pivotally connect the fixed and extension risers in position to adapt the extension steps to fold upwardly and rest upon the tread faces of the lower fixed steps, the extension steps and fixed risers being cut away to permit the extension steps to fold over and upon the fixed steps, substantially as described.

6. In a car extension step, the combination with fixed steps and risers therefor, of brackets attached to the inner side of the lower ends of the fixed risers and having bearing lugs, a plate attached to the outer faces of the upper end of each extension riser and having a bearing lug, a pivot bearing for connecting each pair of lugs, and brace means on the fixed risers to engage and brace the extension risers in their extreme lowered position.

7. In an extension car step, the combination with the fixed steps and risers therefor, of a beveled brace plate attached to the outer side faces of said fixed risers, extension risers pivotally connected to the fixed risers and having beveled faces adapted to engage said brace plates when the extension risers are in their extreme lowered position, and extension steps attached rigidly to said extension risers, the fixed risers and extension steps being notched to permit the extension steps to fold up in position with their inverted tread faces overlapping the fixed risers.

8. In an extension car step, the combination with fixed steps and risers therefor, of extension steps and risers therefor, means to pivotally connect the extension risers to the fixed risers in position to fold up on the outside thereof, said fixed risers and extension steps being cut away to permit the extension steps to fold into position on the fixed steps, means to brace the extension steps and risers from the fixed risers when the extension steps are in extreme lowered position, means to brace the extension where weakened by being cut away, and latch means to hold the steps in raised position, substantially as described.

In testimony whereof I affix my signature in presence of two witnesses.

BROOKS UNDERWOOD.

Witnesses:
NOMIE WELSH,
W. S. SCOTT.

Copies of this patent may be obtained for five cents each, by addressing the "Commissioner of Patents, Washington, D. C."